United States Patent [19]

Nylund

[11] Patent Number: 5,180,550
[45] Date of Patent: Jan. 19, 1993

[54] FUEL ASSEMBLY FOR NUCLEAR REACTOR

[75] Inventor: Olov Nylund, Västerås, Sweden

[73] Assignee: ABB Atom AB, Västerås, Sweden

[21] Appl. No.: 700,807

[22] Filed: May 16, 1991

[30] Foreign Application Priority Data

May 22, 1990 [SE] Sweden ................................ 9001839

[51] Int. Cl.⁵ ............................................... G21C 3/32
[52] U.S. Cl. .................................... 376/449; 376/353; 376/438
[58] Field of Search ............... 376/438, 449, 353, 439, 376/224; 976/DIG. 66, DIG. 73, DIG. 122

[56] References Cited

U.S. PATENT DOCUMENTS

| | | | |
|---|---|---|---|
| 3,971,575 | 7/1976 | Lesham et al. | 285/85 |
| 4,376,092 | 3/1983 | Kmonk et al. | 376/353 |
| 4,418,036 | 11/1983 | Gjertsen et al. | 376/438 |

Primary Examiner—Donald P. Walsh
Assistant Examiner—Meena Chelliah
Attorney, Agent, or Firm—Watson, Cole, Grindle & Watson

[57] ABSTRACT

A fuel assembly for a nuclear reactor is provided with a number of parallel fuel rods, which are retained by means of spacers (2), and guide tubes (3) between the fuel rods. The guide tubes (3) are also attached to the spacers (2) as well as to a top nozzle and a bottom nozzle (4, 5). The guide tubes (3) are provided, at least at the spacers (2), with external threads (7) for improved fixing to the spacers.

9 Claims, 3 Drawing Sheets

FUEL ASSEMBLY FOR NUCLEAR REACTOR

BACKGROUND OF THE INVENTION

The present invention relates to a fuel assembly for a nuclear reactor, preferably of the PWR type.

A fuel assembly of a known design comprises a plurality of fuel rods and guide tubes for control rods or arranged solely as water tubes in certain special nuclear reactors, the fuel rods and guide tubes being maintained in predetermined mutual positions by means of spacer grids, hereinafter simply called spacers, which are positioned along the fuel assembly. Top and bottom nozzles are arranged at the ends of the fuel assembly and fixed to the guide tubes which extend somewhat above and below the ends of the fuel rods. In fuel assemblies of this type, the spacers are prevented, in operation, from moving along the guide tubes by means of a weld to the guide tube or a bulge in the guide tube at the respective spacer. A drawback with such an embodiment is that it is difficult to detach a guide tube from the fuel assembly for repair.

SUMMARY OF THE INVENTION

According to the invention, it is now proposed that the guide tubes, at least at the spacers, are provided with external threads in order to fix the spacers to the guide tubes. In this way, the guide tubes may be threaded into and out of the spacers. This is further facilitated if the spacers are provided with threads, which are uniformly oriented in relation to the threads of the guide tubes, in the guide tube positions.

BRIEF DESCRIPTION OF THE DRAWINGS

The invention will be most readily understood with reference to the accompanying FIGS. 1-11, wherein.

DETAILED DESCRIPTION OF THE PREFERRED EMBODIMENTS

Figure 1:
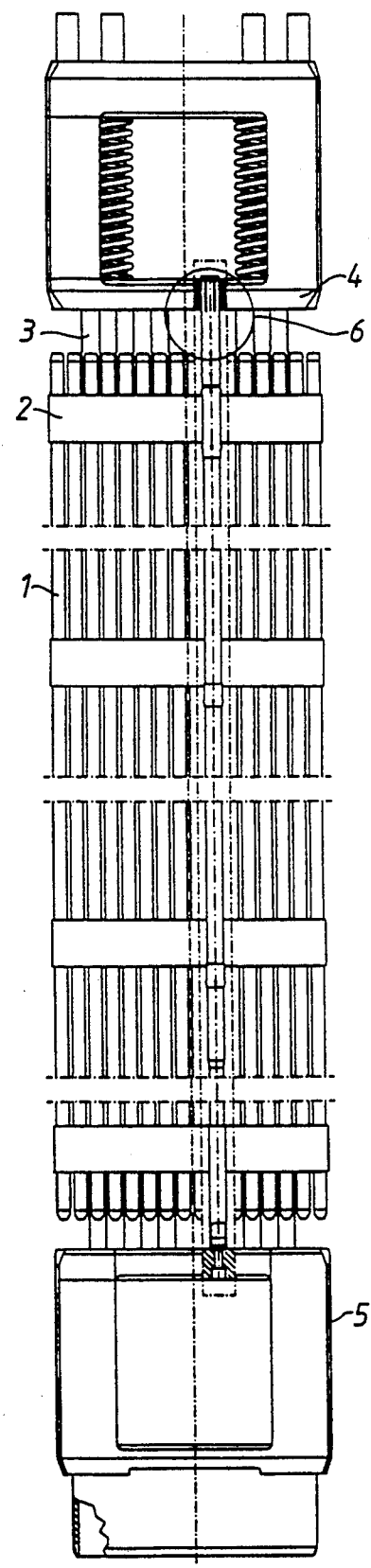
FIG. 1 shows a fuel assembly.

In FIG. 1, 1 designates fuel rods which are retained into a bundle by spacers 2. Also fixed in the spacers are guide tubes 3 for control rods or water. The ends of the guide tubes 3 extend somewhat beyond the bundle and are fixed to the top nozzle 4 and the bottom nozzle 5. A known attachment of a guide tube 3 to the top nozzle is shown encircled at 6.

Figure 2:
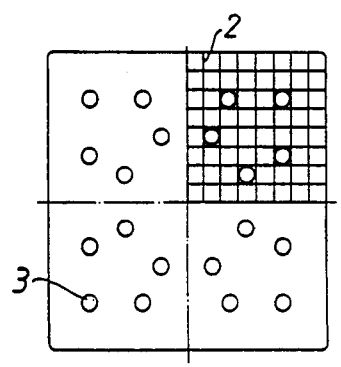
FIG. 2 shows a cross section of the fuel assembly of FIG. 1 at a spacer.

FIG. 2 shows a cross section of the fuel assembly at a spacer 2 with the guide tubes 3.

Figure 3:
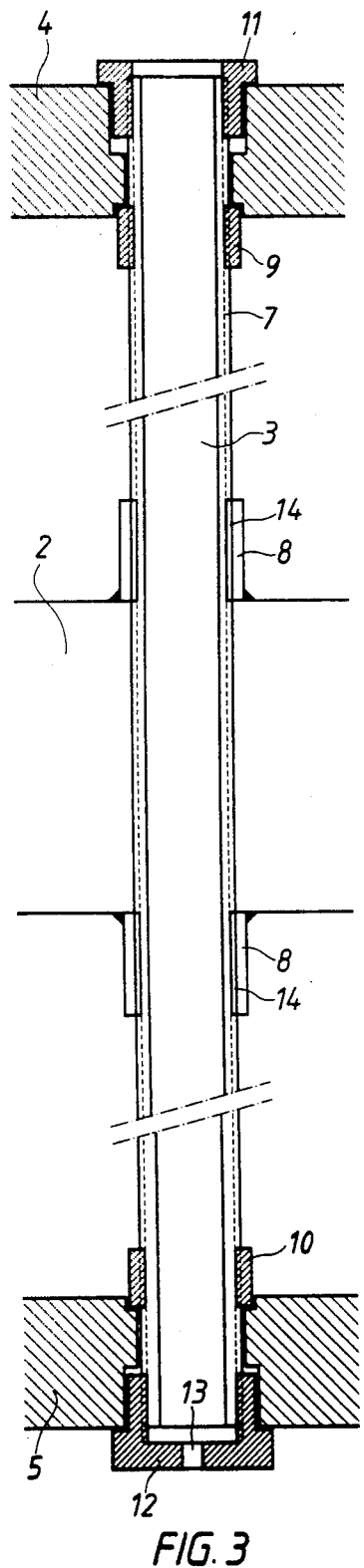
FIGS. 3-6 show different ways of attaching the spacers to the threaded guide tubes.
Figure 4:
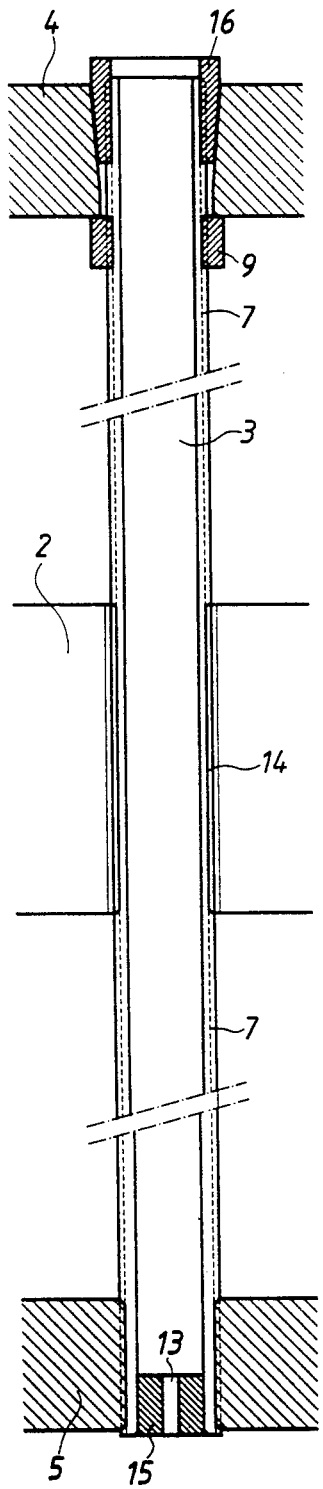
Figure 5:
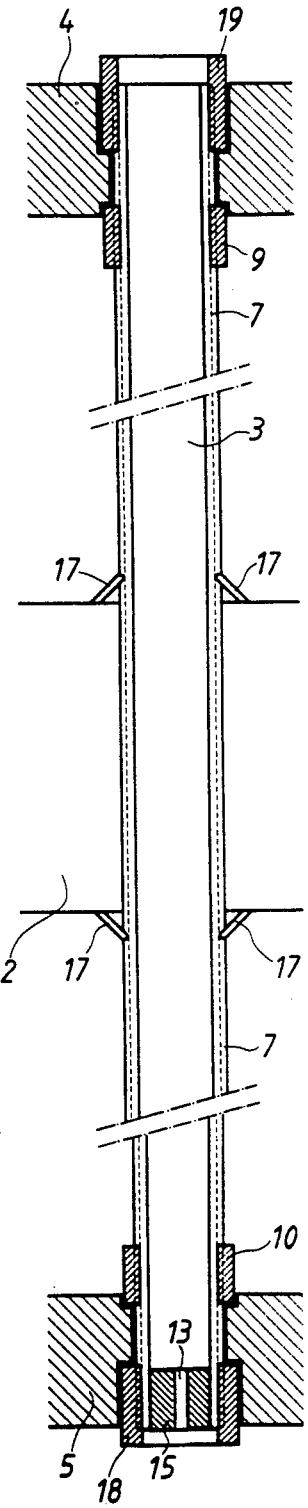

FIGS. 3-5 show different types of possible attachments between spacer 2 and guide tube 3. In FIG. 3 the entire guide tube 3 is threaded with a slightly rising thread 7 with a depth of approximately 0.5 mm. The remaining part of the guide tube 3 has approximately the same thickness. In this embodiment the spacers 2 are provided with external, welded sleeves 8 with threads fitting the guide tube 3. The outside diameter of the guide tube 3 is the same along the entire length, but at the lower part the inside diameter of the guide tube 3 is somewhat reduced. The fixing to the top and bottom nozzles 4, 5 is performed by means of the threaded-on spacing sleeves 9, 10 and fixing sleeves 11, 12, respectively. The fixing sleeve 11 is completely open so as be able to receive a control rod (not shown), whereas the fixing sleeve 12 is provided with a small drainage hole 13. Means for securing guide tubes and sleeves against rotation may be provided but are not shown.

When assembling the fuel rod bundle, the spacers 2 are arranged in a fixture whereupon the guide tubes 3 are threaded into the spacers 2 from above. It is then important that the threads 14 of the spacers 2 for the different guide tubes 3 are uniformly arranged to enable the threads 7 of the guide tubes 3 to engage uniformly in the corresponding threads 14 of the spacers; otherwise stresses will arise between spacers 2 and guide tube 3 during the threading operation. It would, of course, also be possible to provide the guide tube 3, at the lower part, with a threaded pin which precedes the guide tube 3 and takes up a thread in the sleeves 8 of the spacers 2, whereupon the threads 7 of the guide tube 3 engage with the thread 14 of the sleeve while the guide tube 3 continues to rotate. In this way, the guide tube 3 is automatically threaded to the spacer without any stresses in the bundle arising. When the guide tubes 3 have been threaded into the spacers 2, the spacing sleeves 9, 10 have been threaded onto the guide tubes 3 and the fuel rods 1 have been inserted into the spacers 2, the top and bottom nozzles 4, 5 are fixed to the guide tubes 3 with the threaded fixing sleeves 11, 12. The spacers 2 are locked to the guide tubes 3 in a satisfactory manner and are unable to slide along these. In spite of this, a guide tube 3 can be easily detached by simply detaching the fixing sleeves 11, 12 and thereafter threading the guide tube 3 out of the bundle. In FIGS. 3-5 the whole guide tube 3 is threaded. The threads contribute to increase the turbulence in the cooling water which flows along the guide tubes and in this way the cooling of the fuel rods 1 in the fuel assembly is improved.

In FIG. 4, threads 14 are provided directly in the spacer plate and the guide tube 3 is threaded directly to the bottom nozzle 5. At the bottom of the guide tube 3, a plug 15 with a drainage hole 13 is welded. At the top, the guide tube 3 is provided with a spacing sleeve 9 and is fixed to the top nozzle 4 by means of a conical fixing sleeve 16.

In FIG. 5, the spacer 2 has been provided with tabs 17 running in the threads 7 of the guide tube 3. In order to brake the free falling control rods in the event of a reactor trip, the lower part of the guide tube 3 is made with a smaller diameter. In similar manner as in FIG. 3, the guide tube 3 is fixed to the bottom nozzle 5 by means of a spacing sleeve 10 and an open fixing sleeve 18. A plug 15 with a drainage hole 13 seals the guide tube 3 at the bottom At the top the guide tube 3 is fixed to the top nozzle 4 by means of a spacing sleeve 9 and an open fixing sleeve 19. Thus, in a device of this kind, no special thread has to be provided in the spacers 2, which considerably simplifies the manufacturing of the spacers.

Figure 6:
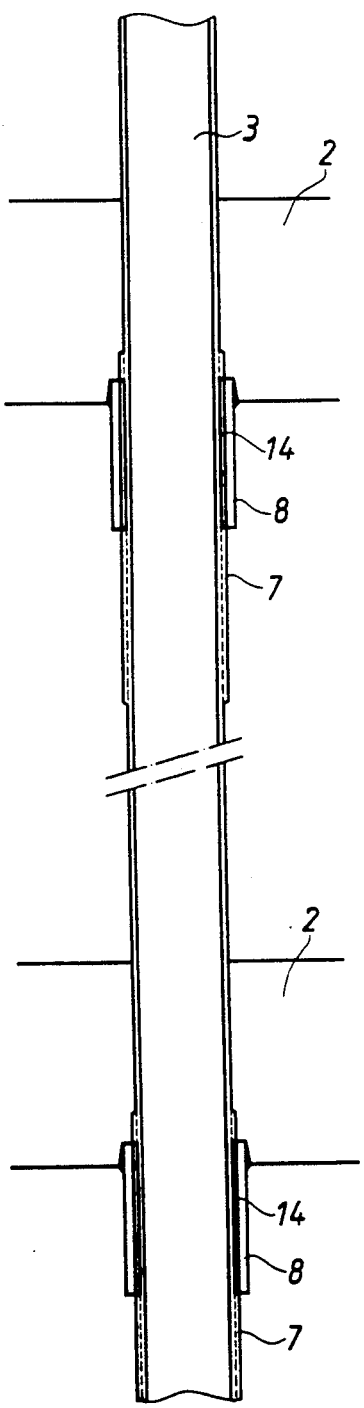

FIG. 6 shows a guide tube 3 which is threaded only to the spacers 2 and a small portion below these. At the spacers 2, sleeves 8 with an internal thread 14 are attached. Because the thread 7 continues somewhat below the sleeve 8 of the spacer 2, the turbulence of the cooling water is increased and the cooling in the fuel assembly is improved.

Figure 7:
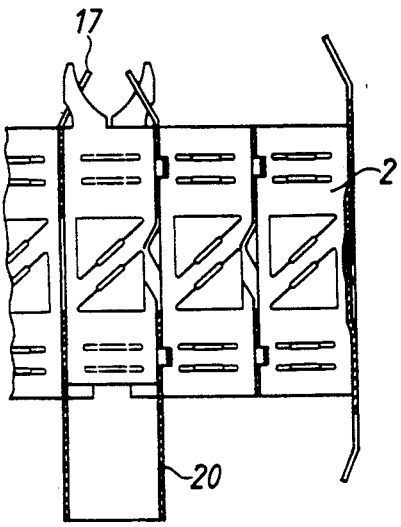
FIGS. 7-9 show different embodiments of a spacer suitable to be fixed in the threads of the guide tubes.

FIG. 7 shows a partial section of a spacer 2 with tabs 17 for a guide tube. The spacer 2 for the guide tube 3 is unthreaded.

Figure 8:
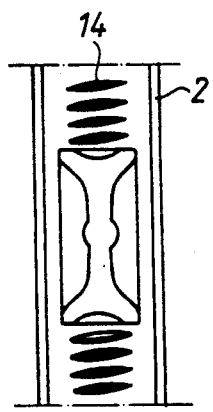
Figure 9:
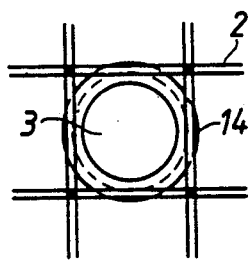

FIG. 8 shows a cell in a spacer 2. Directly in the plate wall of the cell, slots serving as threads 14 have been provided. FIG. 9 shows how a guide tube 3 has been threaded into such a spacer cell.

Figure 10:
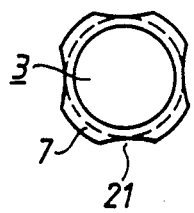
FIGS. 10 and 11 show a guide tube with longitudinal recesses in the threads.
Figure 11:
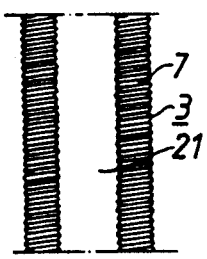

FIG. 10 shows a section of a guide tube 3 with the threads 7. In the threads 7 a number of slots 21 have been milled FIG. 11 shows the guide tube 3 in FIG. 10 seen from the side. The slots may extend straight along the guide tube 3 but may also extend in a spiral around the guide tube in order to further improve the agitation in the cooling water of the fuel assembly.

I claim:

1. A fuel assembly for a nuclear reactor, comprising a number of parallel fuel rods which are retained by means of spacers arranged along the fuel rods and guide tubes arranged between the fuel rods, the guide tubes being fixed to the spacers, a top nozzle and a bottom nozzle between which the guide tubes with the associated fuel rods are fixed, and wherein the guide tubes, at least adjacent said spacers, are provided with external threads in order to fix the spacers to the guide tubes.

2. A fuel assembly according to claim 1, wherein the spacers are provided with threads in the guide tube positions, which threads are uniformly oriented in relation to the threads of the guide tubes.

3. A fuel assembly according to claim 12, wherein the threads of the spacers are arranged in sleeves joined to the spacers, are arranged to engage with the threads of the guide tubes.

4. A fuel assembly according to claim 1, wherein the guide tubes are provided, also at their ends, with threads for fixing the guide tubes to the top and bottom nozzles.

5. A fuel assembly according to claim 1, wherein the guide tubes are provided also at their ends, with threads for fixing the guide tubes to the top and bottom nozzles.

6. A fuel assembly according to claim 1, wherein the thread of the guide tubes is extended to comprise also the guide tubes a certain distance below the spacers in order to improve the turbulence in the cooling water flowing around the guide tubes.

7. A fuel assembly according to claim 1, wherein threads are arranged along the entire guide tube.

8. A fuel assembly according to claim 1, including slots extending axially along the guide tube in the threads.

9. A fuel assembly according to claim 8, wherein the slots are arranged in a spiral around the guide tube.

* * * * *